United States Patent [19]

Gale et al.

[11] 4,193,021

[45] Mar. 11, 1980

[54] APPARATUS FOR GENERATING AND USING A MAGNETIC TAPE TO CONTROL MOVEMENT OF A CO-ORDINATE DRIVE TOOL CARRIAGE

[75] Inventors: Paul E. Gale, Lancaster, Ohio; Endre L. Toth, Danbury, Conn.

[73] Assignee: Arcair Company, Lancaster, Ohio

[21] Appl. No.: 857,169

[22] Filed: Dec. 5, 1977

[51] Int. Cl.² .............................................. G05B 19/42
[52] U.S. Cl. ..................................... 318/568; 318/685
[58] Field of Search .................................. 318/568, 685

[56] References Cited

U.S. PATENT DOCUMENTS

| | | | |
|---|---|---|---|
| 2,755,422 | 7/1956 | Livingston | 318/568 |
| 3,473,157 | 10/1969 | Little et al. | 318/568 X |
| 3,559,021 | 11/1971 | Bingham Jr. | 318/568 |
| 3,842,330 | 10/1974 | Kolell | 318/568 X |
| 3,857,025 | 12/1974 | English et al. | 318/568 X |
| 3,885,207 | 5/1975 | Bosque et al. | 318/568 |

*Primary Examiner*—B. Dobeck
*Attorney, Agent, or Firm*—James C. Simmons; Barry Moyerman

[57] ABSTRACT

A system for generating a magnetic tape having thereon signals corresponding to movement of a co-ordinate drive carriage driven by an optical follower tracing a line drawing. The tape is used to provide signals to an encoder connected to the drive train of a co-ordinate drive positioning system used to carry a cutting device or other apparatus over a workpiece thus reproducing the line drawing on the workpiece with the cutting device or other apparatus. An improved co-ordinate drive oxy-fuel plate cutting machine can be constructed according to the disclosure.

10 Claims, 8 Drawing Figures

APPARATUS FOR GENERATING AND USING A MAGNETIC TAPE TO CONTROL MOVEMENT OF A CO-ORDINATE DRIVE TOOL CARRIAGE

BACKGROUND OF THE INVENTION

1. Field of the Invention

This invention pertains to an apparatus more properly categorized as a system for generating a magnetic tape and then using the magnetic tape to control movement of a co-ordinate drive carriage carrying a tool over a workpiece to accomplish an operation on the workpiece, i.e. flame cutting of a specified shape. The system includes an apparatus for generating a tape containing signals, which signals correspond to the movement of a co-ordinate drive carriage as it moves in response to an optical line follower tracing the outline of a shape on a drawing. The tape is used to control movement of a co-ordinate drive machine used to produce the drawn shape in a workpiece and can produce a multiple number of shapes simultaneously by having a plurality of shape making devices (i.e. oxy-fuel cutting torches) mounted on the co-ordinate drive tool positioning apparatus.

2. Prior Art

Shape cutting machines used to cut patterned shapes from a workpiece are well known in the prior art.

Representative of early devices relying on a cam and cam follower to cause a machine to trace a specific pattern is disclosed in U.S. Pat. No. 2,546,116. Patentee discloses a device wherein the pattern is the cam and the cam follower is connected directly to an oxy-fuel torch. Patentee discloses use of magnetic devices in the drive train to cause movement of the torch to cut a pattern identical to that of a specified cam from a workpiece such as a steel plate.

Oxy-fuel or plasma contour cutting devices are disclosed in U.S. Pat. Nos. 3,423,081; 3,559,971; and 3,717,332. These three patents represent conventional oxy-fuel or plasma cutting devices utilizing a photoelectric cell which follows a pattern placed on a table. The photo-electric cell is connected to a drive mechanism which in turn is connected to a long arm on which are placed one or more oxy-fuel or plasma cutting torches. As the photo-electric cell traces the pattern, movement is transmitted by the direct coupling of the torches to the photo-electric cell so that the trace pattern is reproduced in a workpiece disposed beneath the torches. Such devices require the pattern to be exposed to all of the atmosphere of the shop employing oxy-fuel cutting.

Attempts at eliminating the need for an optical tracer and drawing in the shop area lead to the use of numerical tape control systems such as disclosed in U.S. Pat. No. 3,591,157 wherein patentees disclosed the use of a tape control to move the torches in a pattern dictated by the punched tape. Such tape control devices have also been applied to fabric cutting as disclosed in U.S. Pat. No. 3,991,706 and to cutting anisotropic sheet material with a small cutting wheel such as disclosed in U.S. Pat. No. 3,772,949.

A magnetic tape driven flame cutting machine is disclosed in U.S. Pat. No. 3,153,109. Patentees disclosed the need for photo-electric sensors which are coupled to the tape drive circuit to start and stop the tape drive. Patentees do not disclose how the tape is generated.

Another magnetic tape drive mechanism used in conjunction with a cloth cutting device is disclosed in U.S. Pat. No. 3,614,369.

Lastly, U.S. Pat. No. 3,368,803 discloses a line follower type flame cutting machine wherein a multiplier circuit is used so that small line drawings can be translated into large size shapes to be cut by a torch or torches suspended from a carriage which is carried between two spaced apart rails. This apparatus, like all of the prior art devices relying on an optical line follower connected directly to the torches or other cutting tools, has a serious drawback in that the pattern must of necessity be prepared for use in the field. This means that multiple patterns must be prepared if several machines are used to cut patterns. Likewise, each machine requires an optical line follower, thus increasing the complexity of the machine. Care must be taken to prevent dirt from settling on the drawing or other foreign objects being placed in the vicinity of the line on the drawing lest the optical tracer trace such aberations and thus produce defective pieces of product.

The optical line follower is desired as a drive means because of its unique ability to faithfully follow a line drawing resulting in a finished part with very high dimensional accuracy.

SUMMARY OF THE INVENTION

The benefits of an optical tracing system used in conventional co-ordinate drive cutting machines were realized in a system wherein the optical line follower is used in conjunction with a co-ordinate drive machine to generate a magnetic tape containing signals which are responsive to movement of a carriage driven by the optical line follower assembly. The tape can be generated at a remote location and used to prepare an unlimited number of identical magnetic tapes. The magnetic tape is used to provide information to drive motors on a co-ordinate drive tool carriage to move the tools over a workpiece to reproduce the pattern scanned by the optical tracing head. Mounting the torches on a carriage suspended between spaced apart parallel rails eliminates all of the problems of prior art cantilevered mounted torches of conventional flame cutting machines. Use of a single optical tracer eliminates the expense of a multiplicity of optical tracers in that one tracer can be used to generate a plurality of tapes. Perhaps the biggest advantage of the system is that the tapes can be generated remotely from the shop from where they are to be used thus eliminating all of the problems associated with optical tracers deployed in work areas. Furthermore, the optical tracer can be used on a suitably fixtured conventional drafting table to generate tapes from ordinary blueprints or working drawings.

Therefore, it is the primary object of this invention to provide an improved apparatus for controling movement of a co-ordinate drive positioning system.

It is another object of the present invention to provide an apparatus to generate a magnetic tape and an apparatus to use the magnetic tape to control movement of a co-ordinate drive tool positioning carriage.

It is still another object of the present invention to provide an improved contour cutting device.

It is yet another object of the present invention to provide an improved thermochemical cutting device.

It is still yet another object of the present invention to provide an improved oxy-fuel contour cutting device.

BRIEF DESCRIPTION OF THE DRAWING

FIG. 3 is an enlarged view of the control pendant of the apparatus of FIGS. 1 and 2.

DETAILED DESCRIPTION OF THE PREFERRED EMBODIMENT

The co-ordinate drive positioning system of the present invention consists of two distinct portions. The first is an automatic tape generating system used to prepare the tape for use in controlling the movement of a co-ordinate drive or X-Y positioning apparatus.

Figure 1:
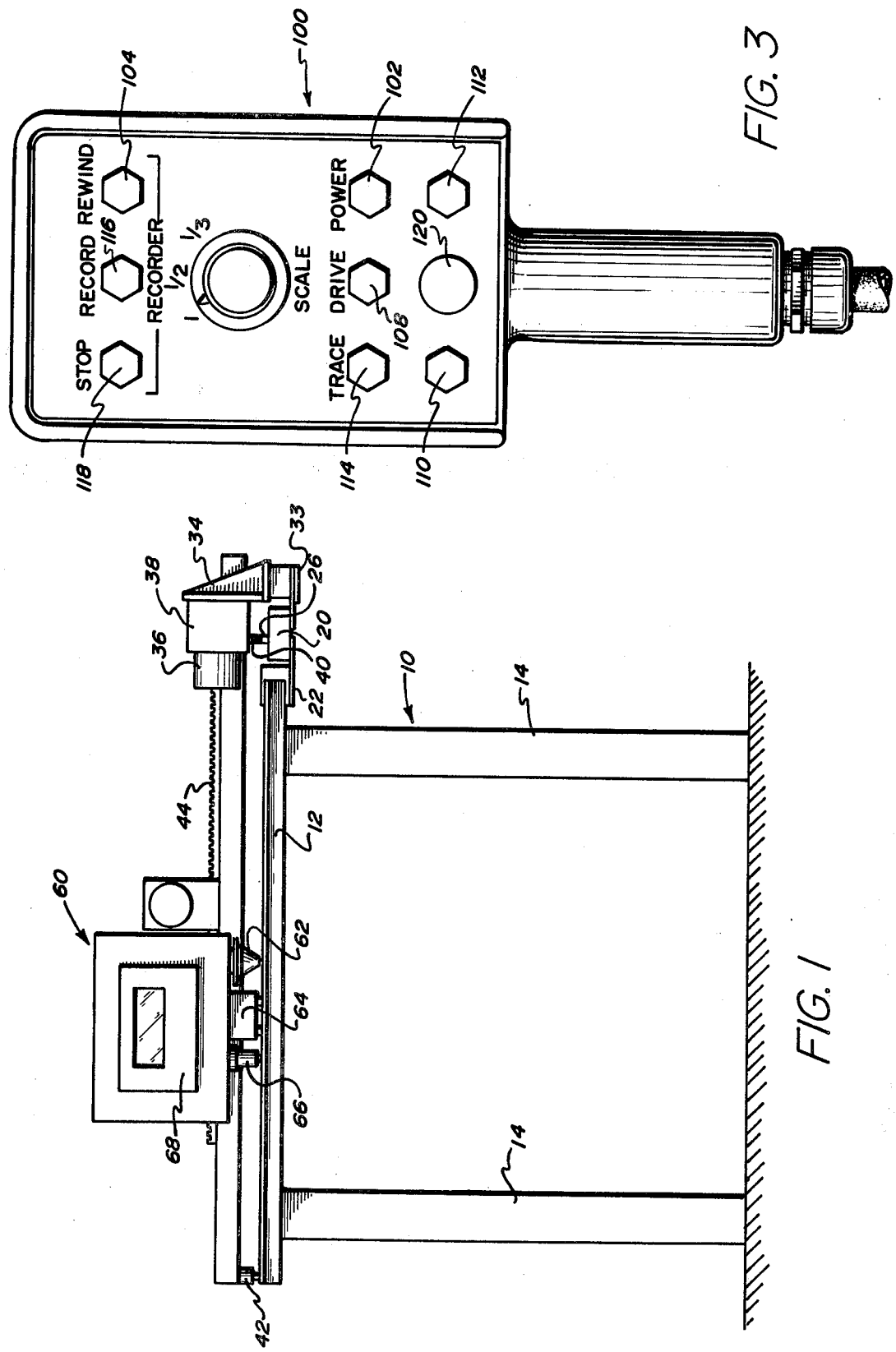
FIG. 1 is a front elevational view of an automatic tape generating device according to the present invention.
Figure 2:
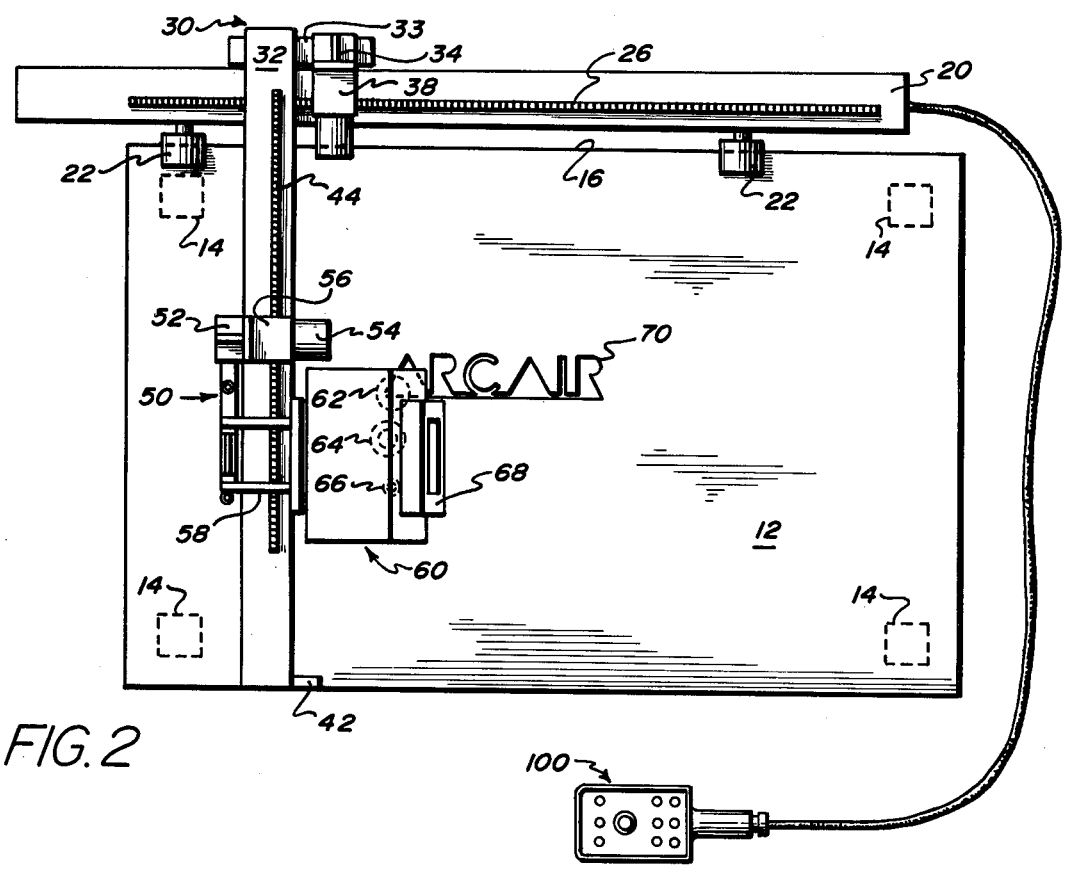
FIG. 2 is a top plan view of the apparatus of FIG. 1.
Figure 4:
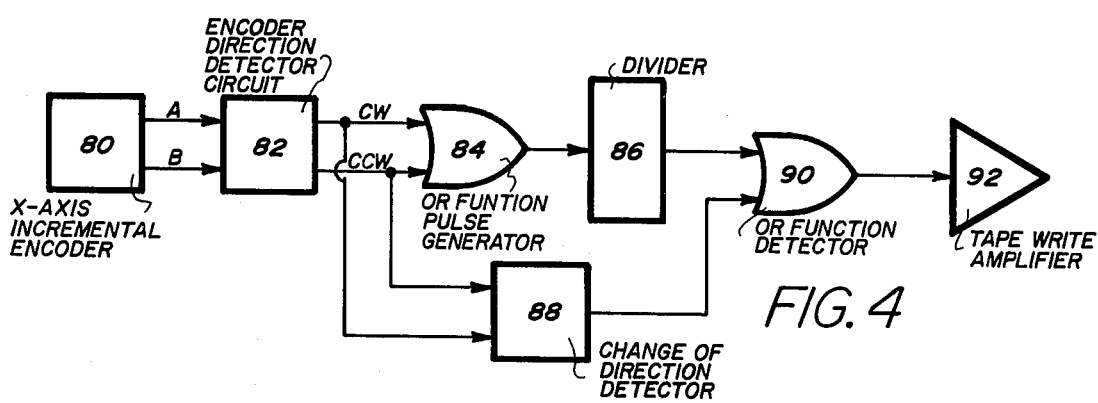
FIG. 4 is a block diagram of the electronic control system for the apparatus of FIGS. 1, 2 and 3.

The automatic tape generating system consists of a mechanical apparatus shown generally as 10 in FIGS. 1 and 2 and a electronic control circuit shown in block form in FIG. 4. The apparatus 10 includes a worktable 12 supported by suitable rigid support members such as a plurality of legs 14 as shown in the drawing. The worktable 12 can be an ordinary drafting table or drawing board used to prepare a mechanical drawings. Generally any flat surface having at least two parallel sides 16, 18 (FIG. 2) is required. The board 12 has removably mounted thereon a first or Y direction track 20. The first or Y direction track 20 is affixed to board 12 by suitable supports such as clamps 22 and 24. First track 20 is positioned parallel to one of the parallel sides of board 12 (e.g. 16) and contains a gear rack 26 disposed generally parallel to one of the parallel sides (16) of the board 12.

Disposed perpendicular to first track 20 is a second track assembly 30 consisting of a second or X track 32. Track assembly 30 includes a base support 33 having mounted thereon a vertical reinforced angle support 34 which carries a first track or Y axis position encoder 36 mounted through suitable gearing to a carriage 38 adapted to ride along the first or Y track 20 being coupled thereto by a pinion gear 40 (FIG. 1). The second track assembly 30 includes a rolling support 42 adapted to support the end of second track 32 and guide it along the parallel side 18 of board 12. Track 32 is thus supported at a fixed height above the board 12, parallel to the upper surface thereof and adapted to move parallel to sides 16, 18 of table 12 along first track 20.

A drive assembly support 50 is arranged for slidable movement along second or X axis track 32. Drive assembly support 50 includes a reinforced angular support 52 similar to support 34 and is adapted to mount and couple a second track or X axis encoder 54 to a suitable mechanical drive 56 similar to mechanical drive 38; drive 56 having a pinion gear (not shown) mating with a gear rack 44 disposed on track 32. Support 50 includes a harness or other structural support system 58 for supporting a carriage 60. Carriage 60 is adapted to carry an optical tracing head 62 and associated drive mechanisms 64, 66 so that the optical tracer can follow a pattern such as the company name Arcair 70 on a drawing placed on table 12. The functioning of optical tracer and drive mechanism is described in U.S. Pat. No. 3,717,332 the specification of which is incorporated herein by reference. Optical tracing and drive mechanisms of this type are commercially available from the Canadian Westinghouse Corporation under the designation of Model HL10. Associated with carriage 60 and the drive mechanism is a magnetic tape recorder 68. Cassette recorders of this type are well known.

The automatic tape generator electronic control system is generally known in block diagram in FIG. 4. As stated before the optical tracer is a commercially available item so the electronics associated therewith need not be explained. The electronic system for the automatic tape generator consists of an incremental encoder or X axis incremental encoder shown schematically as block 80. Incremental encoder 80 has two outputs labeled as arrows A and B. Outputs A and B are sign waves the amplitudes of approximately 50 millivolts as the encoder 54 (X axis or second track) is rotated. A commercially available encoder such as model 77 marketed by Dynamics Research Corporation of Wilmington Massachusetts is suitable for this purpose. Outputs A and B are fed to an encoder direction detector circuit 82 which produces 15 volt pulses on the output lines marked cw for clockwise and ccw counterclockwise depending upon the phase relationship of outputs A and B. Circuits of this type have been described in the literature. Block 84 represents a pulse generator that performs an OR function so that the pulses from encoder 54 are passed to divider 86 regardless of the direction of the encoder 54 rotation. Divider circuit 86 scales the output pulses. Block 88 represents a circuit which can detect a change in the direction of rotation of encoder 54. When circuit 88 detects a change in direction a burst of pulses of higher frequency than the maximum frequency of encoder pulses are generated. Item 90 represents another OR function detector such as block 84 to transmit the encoder 54 pulses or the pulse burst from circuit 88. Item 92 represents the tape write amplifier which writes the pulses on the tape by causing a saturated flux reversal. All of the foregoing component parts of the circuitry are commercially available and well known to a worker skilled in the art. The schematic diagram of FIG. 4 can also be used to explain the electronics for the Y axis incremental encoder 36 because they are identical except for the substitution of the Y access incremental encoder 36 for the X access incremental encoder 54 in box 80.

In describing the operation of the automatic tape generating system of FIGS. 1 through 4 one can assume that a number of shapes have been selected to be flame cut out of the same thickness of material and the width of the uncut plate has been determined. The shapes can be the Arcair logo shown as 70 in FIG. 2.

The width of the board 12 can be any convenient dimension say 4 feet which determines the length of the X axis and represents the width of the material to be cut regardless of its actual size. The length of the board can be any convenient dimension such as 6 feet which determines the length of the Y axis and represents the length of the plate. In order to utilize full width of a normal 8 foot wide plate the draftsman will lay out a nest of area shapes in a $\frac{1}{2}$ scale while drawing the tracing template 70.

The template 70 will be placed on the tracing board and covered with a plexiglas sheet (not shown). If a tool offset (kerf) is desired this can be accomplished by setting a dial on the optical tracer 62 as is well known. The operator then takes control pendant 100 (FIGS. 2 and 3) in hand to activate the automatic tape generator. The optical tracer 62 is positioned at any convenient location along the template 70 by moving the carriage 60 along the track assembly 30 and track assembly 30 along track 20 as is well known in co-ordinate drive cutting devices. Power switch 102 in control pendant 100 is turned on and a tape cassette loaded into the recorder 68. Rewind button 104 is depressed to position the tape at the beginning of its usable length. Scale selector 106 is set to the ½ position. With drive switch 108 in the on position, the tracer is guided to the starting line using directional push buttons 110 and 112. When the tracer eye is over the starting line, tracer switch 114 is turned on and record button 116 is depressed. At this point the automatic tape generating system will follow the pattern and record the data generated by movement of the carriage assembly in the X and Y directions dictated by movement of the optical tracer. At the end of the tracing, the recorder and the tracer will be turned off and the tape cassette can be removed. Control pendant 100 includes a manual stop button 118 and a fuse block 120.

As stated above the electronics of the automatic tape generator are well-known so that a worker skilled in the art would have no problem in making the required wiring diagram in accord with the foregoing description.

Figure 5:
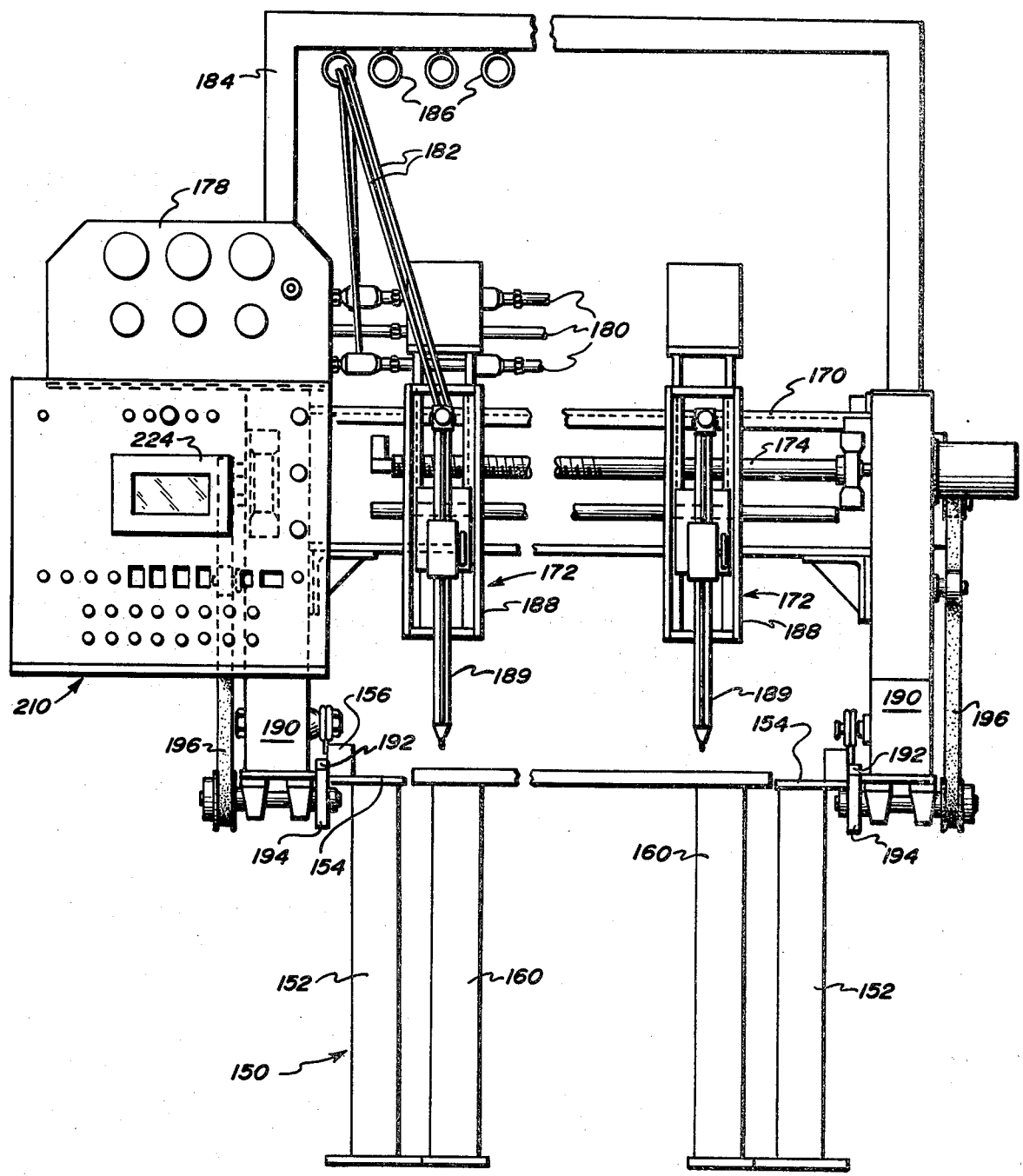
FIG. 5 is a front elevational view of a co-ordinate drive positioning apparatus according to the present invention.
Figure 7:
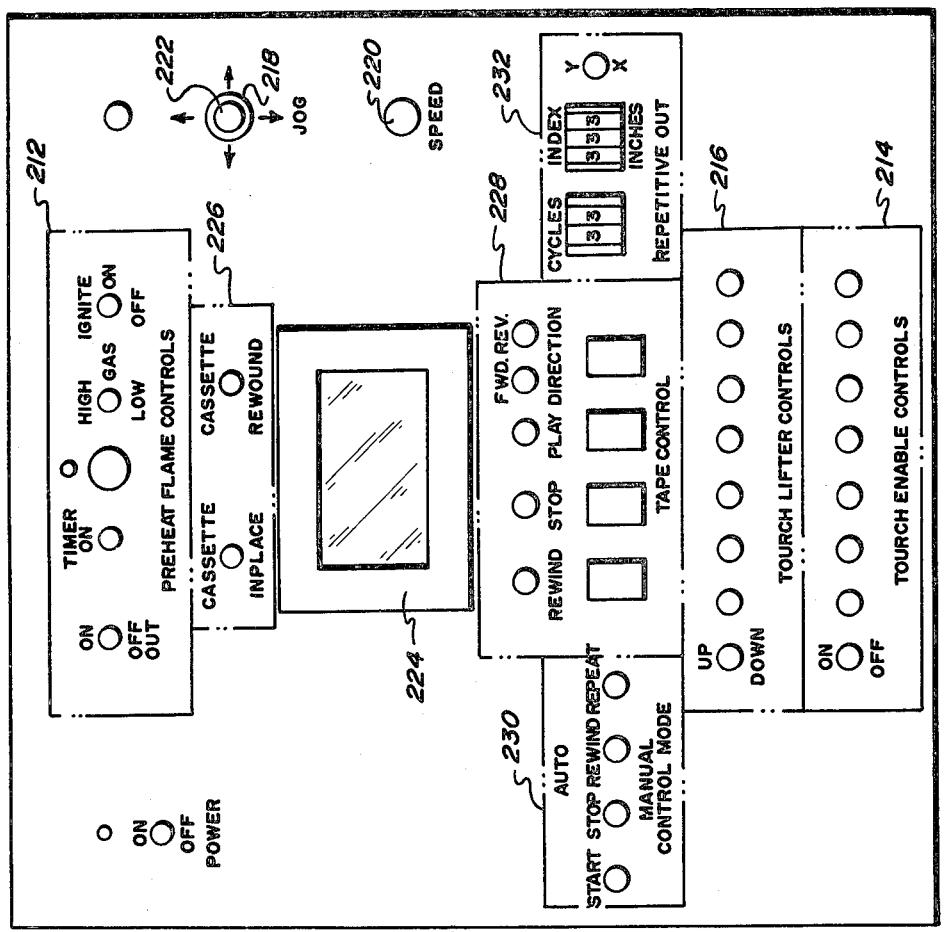
FIG. 7 is an enlarged view of the control panel of the apparatus of FIGS. 4 and 5.
Figure 6:
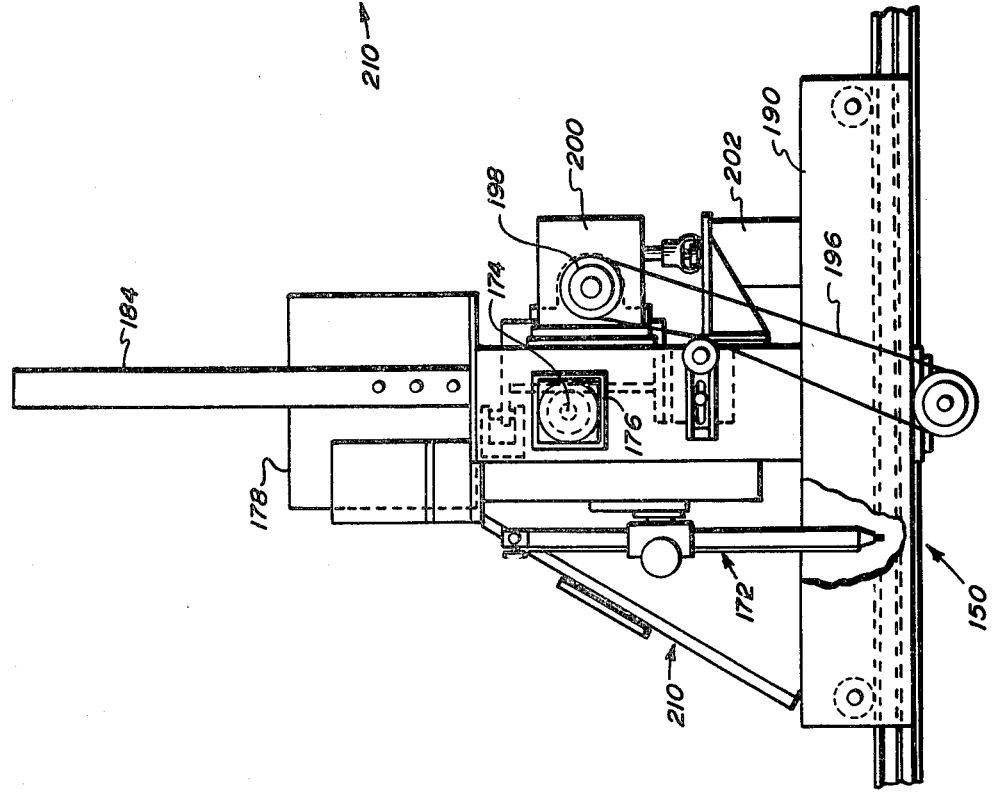
FIG. 6 is a right elevational view of the apparatus of FIG. 4 with portions eliminated and/or broken away for clarity of illustration.

Once the tape is recorded it can be used to make multiple copies one of which can be used in the apparatus shown in FIGS. 5-7. The apparatus of FIGS. 5-7 is generically referred to as a co-ordinate drive positioning system or an X-Y positioner 150. The co-ordinate drive positioning system or X-Y positioner 150 includes at least 4 pedestal supports 152 only two of which are shown in the drawing, supporting a pair of spaced apart parallel rail supports 154 each of which support a pair of parallel rails 156. Disposed between the parallel rails and rail supports is a conventional cutting table 158 supported by a plurality of upright support members 160 two of which are shown in the drawing.

Overall, the co-ordinate drive positioner or X-Y positioner 150 is constructed in a manner similar to other gantry type (bridge type) tool positioning or flame cutting machines. The positioner runs on top of the horizontal parallel rails 156 which are supported by the pedestal members 152 disposed along the rails for support as needed. The parallel tracks 156 represent the Y axis. Disposed transversally of the parallel rails 156 is a cutting torch support carriage 170 which represents the X axis of the machine. One or more torch or tool carriages 172 are mounted for transverse movement along carriage 170 by a screw drive 174 disposed on carriage 170. Screw drive 174 is activated by a stepping motor 176 which responds to commands from one track or channel of the cassette tape noted as the Y-axis tape track, as will hereinafter be more fully described. In the case of a flame cutting machine the main structure is equipped with the customary fuel and oxygen pressure and flow control panel 178 and gas distributing manifold system 180 complete with hoses 182 which may be supported by an overhead frame 184 having thereon a plurality of hose supports 186. The gas distribution system can be in any convenient form that will assure safe operation of the apparatus. Each tool support 172 includes a conventional tool or torch lifter 188 and tool or oxy-fuel torch 189. The torch lifters can be of any design such as disclosed in U.S. Pat. Nos. 3,559,971 or 3,717,332.

Torch support carriage 170 is mounted on a Y direction carriage 180 as is well-known in the art. However, for the present invention the Y direction carriage 190 is mounted so that the underside of parallel rails 156 are equipped with continuous gear racks 192 to facilitate the parallel drive of the gantry. Racks 192 engage pinion gears 194 on either side of the gantry. Pinions 194 are connected by cog belts 196 through a common drive shaft 198 (FIG. 2) through a suitable gear reducer 200 to a second stepping motor 202 (FIG. 2). This drive system will execute the position and speed commands read from another track or channel of the cassette tape denoted generally as the X axis tape track. By means of conventional controls the entire system is wired to be controlled by means of control panel 210 shown in detail in FIG. 7. In addition to torch lifter control 216 there is a four position jog lever 218 for quick positioning of the torch or torches in respect to the plate for manual cutting or for beginning a programmed cutting operation. Speed setting dial 220 determines the process speed during cutting or jogging. A high speed traverse push button 222 is incorporated in the jog lever 218 for rapid positioning of the torches.

A tape play back mechanism 224 is mounted in the center of control panel 210 and it is equipped with a spring biased sealed door which keeps dust out of the tape player. The lights shown in box 226 above the tape play back mechanism show the status of the tape, e.g. in place and rewound.

Below the tape play back mechanism 224 are the tape player control switches with their respective signal lights shown in box 228. These switches control the start and stop of the tape player, either forward or reverse direction, and include a switch for tape rewind.

Another group of switches shown in box 230 permit the operator to manipulate the machine in a variety of modes. When all switches except the repeat switch, are set to the auto position, after torch ignition the system goes through automatic preheat, a pierce cycle, and a cut cycle until the commands on the tape are depleted, then the machine executes an orderly shutdown including rewinding of the tape. Selective actuation of some switches permits the selection of part of the automatic cycle.

On the right side of panel 210 another group of controls shown in box 232 are dedicated to repetitive cutting. With the repeat switch shown in box 230 in the auto position the machine will repeat a full cutting cycle 99 times in the direction of either axis (selected with selectible index). Thus, the draftsman only has to lay out one row of interlinked shapes across the plate, record it and the machine repeats the same cycle by rewinding the tape and automatically repositioning to the desired index. This saves considerable tape preparation time and permits the use of a small tape package.

Figure 8:
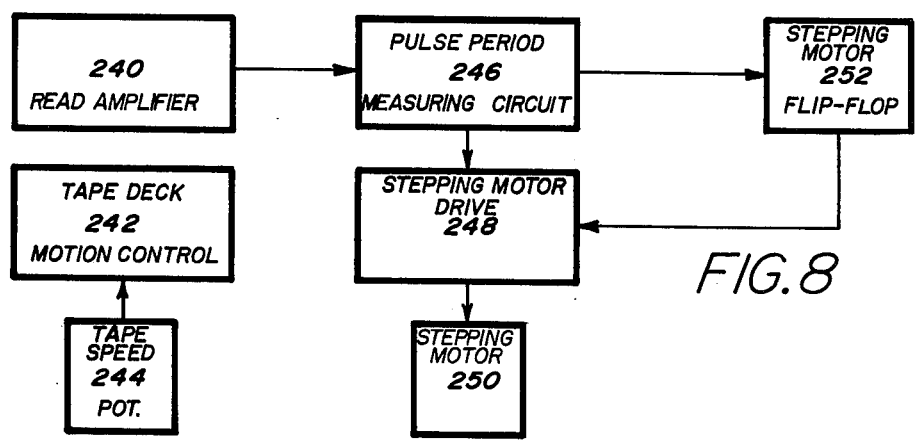
FIG. 8 is a block diagram of the electronic control system of the apparatus of FIGS. 5, 6 and 7.

FIG. 8 shows the X-Y positioner electronics in the form of a functional block diagram for one axis. Since the X-Y positioner can be used for many operations (e.g. flame cutting, machining, flame spraying and the like) only the electronics used in positioning will be described.

The tape that was created by the automatic tape generating system of FIGS. 1-4 is read by a readout system shown as block 240. Block 240 represents a commercially available read amplifier for digital circuits. The tape deck motion control circuits shown as block 242 is a commercially available item and is controlled by a tape speed potentiometer 244. Pulses from tape read electronics 240 are evaluated by a pulse period measuring circuit shown as block 246 which measures the time period between pulses to determine whether the pulses are encoder pulses or a change direction pulse burst. Encoder pulses are directed to stepping motor drive represented by box 248 which in turn is connected to a stepping motor represented by box 250. Stepping motor drive 248 is a commercial drive which causes a 1.8 degree rotation of the stepping motor for each pulse inputted. Pulses that are from the change direction pulse burst are detected because of their higher frequency and generate a toggle signal which is directed to a stepping motor directional flip-flop shown as block 252. Block 252 represents a flip-flop which determines the stepper motor direction. It reverses the motor direction whenever the toggle signal is received from pulse measuring circuit 246.

It should be understood that the X-Y positioner is not limited to stepping motor drives exclusively. Direct current motors with appropriate feedback encoders could replace the stepping motor shown as block 250. In this case the circuits of block 248 would be replaced with circuits to accumulate the pulses from pulse period measuring circuit and compare them with the accumulated pulses from the feedback encoders. The circuit would drive the direct current motor to keep the feedback encoder position identical with the encoder pulses from the pulse period measuring circuit 246. This type of circuit is commonly used in numerical control machines.

From the foregoing it is apparent that once the tape is generated by the automatic tape generating system of FIGS. 1 through 4 and it is placed in the tape drive mechanism associated with the co-ordinate drive or X-Y positioner 150 that a pattern so dictated on tape can be reproduced in a workpiece by any number of tools such as oxy-fuel torches, laser cutting devices, electron beam cutting devices, plasma cutting devices, high power water cutting devices, mechanical tools (e.g. lathe cutting tool) to achieve a desired shape from the workpiece. The workpiece can be metal, wood or fabrics and the invention is not limited to that which is being worked upon.

As set out above the mechanical arrangement of the gantry system can be embodied in various forms. However, the gantry system is preferred to eliminate cantilever positioning of the torches to assure more accurate positioning of the torch relative to the workpiece.

Having thus described our invention what we desire to be secured by letter patented of the United States is set forth in the following claims.

What is claimed:

1. In a co-ordinate drive positioning system adapted for use in oxy-fuel, laser, electron beam, plasma, water, or mechanical tool working of a metal or non-metallic workpiece the improvement comprising in combination:
   a first track adapted for mounting on a pattern holding surface;
   a second track movably mounted at right angles to said first track and adapted to move along said pattern holding surface at right angles to said first track;
   a tracing control assembly including an optical tracing unit with integral drive means movably mounted on said second track to follow a line pattern on said pattern holding surface and move said second track and said tracing control assembly;
   means on said first and second track to generate signals responsive to movement of the second track and tracing control; said signal generating means includes encoders to generate proportional pulse trains corresponding to displacement of the tracing control and second track movement relative to said pattern;
   a magnetic tape recorder for generating a tape based upon said generated signals said tape recorder including means to scale said recording so that a pattern of different size than that traced by said co-ordinate drive positioning system can be utilized in generating said tape; and
   a separate co-ordinate drive positioning system having means to play back said tape and generate signals to move said co-ordinate drive positioning system along an associated workpiece in accord with the pattern used to generate said taped signals.

2. A system according to claim 1 wherein said second carriage includes a pinion gear engaged to a mating gear rack on said first carriage.

3. A system according to claim 1 wherein said tracing control includes a pinion gear engaged to a mating gear rack on said second carriage.

4. In a co-ordinate drive positioning system adapted for use in oxy-fuel, laser, electron beam, plasma or other thermochemical apparatus for cutting shapes from metallic sheet or plate stock the improvement comprising:
   an automatic magnetic tape generator comprising in combination a first track adapted for mounting on a pattern holding surface; a second track movably mounted at a right angle to said first track and adapted to move along said pattern holding surface at right angles to said first track; a tracing control assembly including an optical line follower and drive means mounted on said second track adapted to follow a pattern on said pattern holding surface and move said second track and tracing control assembly said movement causing means on said second track and said control assembly to generate signals said signal generating means including encoders to generate proportional pulse trains corresponding to displacement of the tracing control as the tracing control and second track move relative to said pattern and means for feeding said signals to a tape recorder thus generating a magnetic recording of signals corresponding to the shape of said pattern; and
   a separate co-ordinate drive positioning apparatus including a cutting table disposed between two rails, said rails adapted to support said co-ordinate drive positioning means on a gantry like support system adapted to straddle said table in one dimension and move over said table a distance at least equal to the other dimension of said table having disposed thereon at least one selected cutting means and including a magnetic tape player to receive said tape generated by said automatic magnetic tape generator and play back said signals on said tape to drive said co-ordinate drive positioning apparatus along a workpiece disposed beneath said cutting means to move said cutting means to reproduce said pattern in said plate.

5. A system according to claim 4 wherein said second carriage includes a pinion gear engaged to a mating gear rack on said first carriage.

6. A system according to claim 4 wherein said tracing control includes a pinion gear engaged to a mating gear rack on said second carriage.

7. A system according to claim 4 including means to manually move said automatic magnetic tape generator tracing control assembly to a starting point.

8. A system according to claim 4 including means to manually move said co-ordinate drive positioning apparatus to position said cutting means at a point on said workpiece.

9. A system according to claim 4 including means to activate said cutting means at the beginning of a cycle and deactivate said cutting means at the end of a cycle.

10. A system according to claim 4 including means to reproduce said pattern by each of said cutting means disposed on said positioning apparatus a plurality of times alongs a major axis of said workpiece.

* * * * *